(12) United States Patent
Arambepola et al.

(10) Patent No.: US 8,340,222 B2
(45) Date of Patent: Dec. 25, 2012

(54) PARAMETER AND SCATTERED PILOT BASED SYMBOL TIMING RECOVERY

(75) Inventors: Bernard Arambepola, Enfield (GB); Thushara Hewavithana, Borehamwood (GB); Praveen K. Shukla, Nottingham (GB)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 12/647,060

(22) Filed: Dec. 24, 2009

(65) Prior Publication Data

US 2011/0158334 A1 Jun. 30, 2011

(51) Int. Cl.
*H04L 27/00* (2006.01)
*H04J 11/00* (2006.01)
(52) U.S. Cl. .................................. 375/316; 370/210
(58) Field of Classification Search .................. 375/259, 375/260, 285, 316, 346, 343; 370/203, 208, 370/210

See application file for complete search history.

(56) References Cited

U.S. PATENT DOCUMENTS

| | | | |
|---|---|---|---|
| 7,539,255 B2* | 5/2009 | Redfern | 375/260 |
| 7,672,384 B2* | 3/2010 | Giannakis et al. | 375/260 |
| 2006/0078075 A1* | 4/2006 | Stamoulis et al. | 375/346 |
| 2006/0268676 A1* | 11/2006 | Gore et al. | 370/210 |
| 2008/0084817 A1* | 4/2008 | Beckman et al. | 370/210 |

FOREIGN PATENT DOCUMENTS

EP 2387173 A2 * 11/2011

OTHER PUBLICATIONS

Mingqi et al., "Novel Method of Carrier Frequency Offset Estimation for OFDM System disclose," IEEE 2003, pp. 965-972.*

* cited by examiner

*Primary Examiner* — Tesfaldet Bocure
(74) *Attorney, Agent, or Firm* — Garrett IP, LLC

(57) ABSTRACT

Methods and systems to resolve the cyclic time ambiguity of a scattered pilot based channel impulse response, including to determine a channel impulse response from a combination of scattered pilots and encoded parameters, such as L1-pre signaling within P2 symbols of a terrestrial digital video broadcast (DVD) in a single frequency network (SFN), and including to re-use a corresponding window time to track the channel impulse response in the absence of encoded parameters. Methods and systems disclosed herein may be implemented with respect to channel acquisition and tracking, including adjusting a Fast Fourier Transform trigger point to reduce inter-symbol interference.

20 Claims, 9 Drawing Sheets

US 8,340,222 B2

PARAMETER AND SCATTERED PILOT BASED SYMBOL TIMING RECOVERY

BACKGROUND

Inter-symbol interference (ISI) may arise when multiple instances of a transmitted signal are received at different times and with different signals strengths. The multiple instances may correspond to echoes or multi-path between a single transmitter and a receiver, and/or to multiple original instances of a signal, each transmitted from a corresponding transmitter, such as in a single frequency network (SFN).

ISI may impact channel equalization and demodulation. ISI may be reduced or eliminated in an OFDM system by adjusting a Fast Fourier Transfer (FFT) trigger point.

A signal may include a guard interval during which a FFT is to be triggered. When only one instance of a signal is received, the FFT may be triggered anywhere within the guard interval without incurring ISI. Where multiple instances of a signal are received within a delay spread that is less than the guard interval, there is a trigger point within the guard interval that will not result in ISI. Where the delay spread is greater than the guard interval, there will be ISI with respect to all points within the guard interval, which may be minimized with adjustment to the FFT trigger.

A FFT trigger point may be controlled by a symbol timing recovery process, which may include tracking a channel impulse response and adjusting the FFT trigger point in response to the channel impulse response. The channel impulse response may be determined from estimated channel frequency responses, such as with an inverse FFT (IFFT).

In a SFN, where transmitters are spaced relatively close to one another, a delay spread of signals from multiple transmitters may be similar to delay spreads associated with echoes and multi-paths in a single transmitter environment. Where transmitters are spaced relatively distant from one another, the delay spread may be relatively great.

SFNs are used in terrestrial digital video broadcast (DVB) to broadcast the same television signal at the same frequency from all transmitters in the network and thereby reduce the usage of the radio spectrum. In multi-frequency networks (MFNs) same television signal is transmitted at different frequencies by different transmitters to avoid interference at the receivers. In SFNs the interference from different transmitters are treated as echoes and are cancelled at the receiver using signal processing techniques.

Terrestrial DVB signals may be transmitted in accordance with one or more standards, such as a DVB-Terrestrial (DVB-T) standard and a DVB-Second Generation Terrestrial (DVB-T2) standard, promulgated by the Digital Video Broadcasting Project, an industry led consortium (http://www.dvb.org/index.xml), including standard, ETSI EN 302 755 V1.1.1, (2009-09), titled, "Digital Video Broadcasting (DVB); Frame Structure Channel Coding and Modulation for a Second Generation Digital Terrestrial Television Broadcasting System (DVB-T2)," publicly available at http://www.dvb.org/technology/dvbt2/. ETSI EN 302 755 V1.1.1 provides for a P2 symbol having L1-pre signaling, described below with respect FIG. 4.

An orthogonal frequency division multiplex (ODFM) signal may include periodic pilots on every $m^{th}$ carrier signal. The pilots may occur at different carrier frequencies in different symbols, and are thus referred to as scattered pilots. Time interpolation or time prediction may be used to estimate channel frequency responses of every $n^{th}$ carrier signal from the scattered pilots. For example, m may be equal to 12 and n may be equal to 3.

Where channel frequency responses are only available for every nth carrier frequency, an IFFT provides indistinguishable periodic replicas of the channel impulse response. This is referred to herein as channel impulse response cyclic time ambiguity.

BRIEF DESCRIPTION OF THE DRAWINGS/FIGURES

Figure 1:
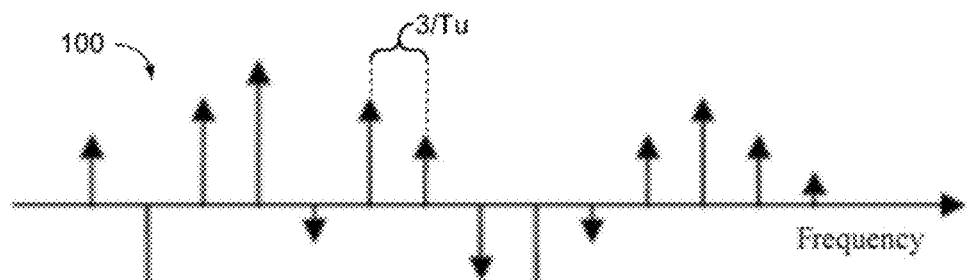
FIG. 1 is depiction of channel frequency responses, which may be generated from scattered pilots of an OFDM signal.

In the drawings, the leftmost digit(s) of a reference number identifies the drawing in which the reference number first appears.

DETAILED DESCRIPTION

FIG. 1 is depiction of an example channel frequency response 100, which may be generated from scattered pilots of an OFDM signal.

The OFDM signal may include a digital video broadcast signal in a single frequency network (SFN) environment, and may be formatted in accordance with a DVB standard including, without limitation, DVB-T2.

The OFDM signal may have a symbol duration of Tu, a carrier spacing of 1/Tu, and scattered pilots at every $m^{th}$ carrier frequency in each symbol. The scattered pilots may be arranged such that the channel frequency response can be estimated at every $n^{th}$ carrier frequency. For example, m may be equal to 12 and n may be equal to 3. Where n equals 3, for example, points of channel frequency response 100 have a frequency spacing of 3/Tu.

Figure 2:
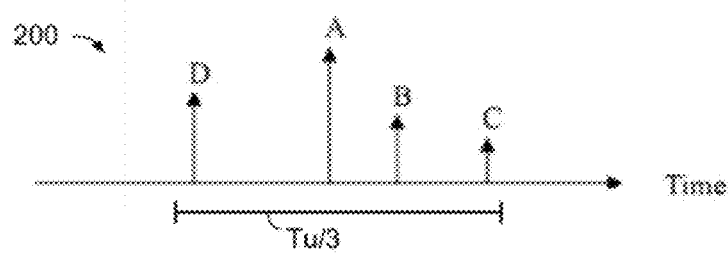
FIG. 2 is depiction of a channel impulse response, which may correspond to the channel frequency responses of FIG. 1

FIG. 2 is depiction of an example channel impulse response 200, which may correspond to channel frequency response 100. Channel impulse response 200 includes four signals or paths A, B, C, and D, amplitudes of which may represent corresponding signal amplitudes or power. In the example of FIG. 2, the amplitude of path A is greater than the amplitudes of paths B, C, and D, and may be designated a main or primary path. Paths B and C are delayed in time relative to path A, and are referred to herein as post-echoes. Path A is delayed in time relative to path D, and path D is referred to herein as a pre-echo.

Channel impulse response 200 may be generated by performing an Inverse Fast Fourier Transform (IFFT) with respect to channel frequency response 100. Where channel frequency response 100 is determined once every n carrier frequencies, samples of the channel frequency responses 100 are available with a frequency spacing of n/Tu, and the IFFT provides an impulse response over an interval Tu/n. For example, where n equals 3, channel frequency responses 100 are determined with a frequency spacing of 3/Tu, and the IFFT provides the channel impulse response over a time interval of Tu/3. In other words, the channel impulse response may be generated with respect to a delay spread of Tu/3.

The IFFT also provides replicas of the channel impulse response that are periodic at Tu/n. The cyclic nature of the channel impulse response is referred to herein as channel impulse response cyclic ambiguity, and is described below with respect to FIG. 3.

Figure 3:
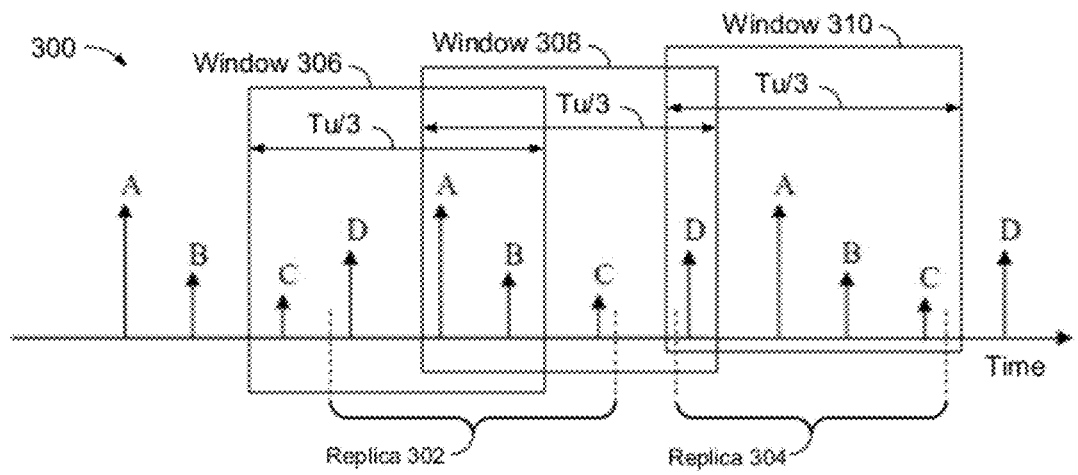
FIG. 3 is depiction of a sequence of time-domain points, corresponding to output bins of an IFFT performed on channel frequency responses.

FIG. 3 is a depiction of a sequence of time-domain points 300, corresponding to output bins of an IFFT performed on a channel frequency response, such as channel frequency response 100 in FIG. 1.

Points 300 include multiple replicas of paths A, B, C, and D of FIG. 2, including replicas 302 and 304, one of which is to be identified as the correct channel impulse response.

Demodulation may be performed in response to an initial trigger point, and the FFT trigger may be adjusted in response to the identified channel impulse response, such as to reduce ISI. Demodulation accuracy and/or reduction of ISI may depend on identification of the correct replica.

FIG. 3 includes example windows of time, 306, 308, and 310. If window 306 is used to demodulate, the post-echo of impulse C in FIG. 2 becomes a pre-echo. If window 308 is used to demodulate, the pre-echo of impulse D in FIG. 2 becomes a post-echo. In both situations, an incorrect channel impulse response is obtained, which may adversely impact symbol timing recovery. The actual impulse response may be any segment of length Tu/n in the periodic signal of FIG. 3.

Cyclic ambiguity may be avoided by imposing constraints on the channel impulse response. For example, post-echoes and/or pre-echoes may be constrained to lie within a time interval of one half the Tu/n period or Tu/6 in the examples above with respect to the strongest path, and centering the window at the strongest component. This may be represented by window centered about path A. Such an approach may be sufficient for non-SFN environments and for small to medium SFN environments, where small to medium may refer to distances between the transmitters. For example, for 8K OFDM in an 8 MHz channel, Tu may be approximately 896 micro-seconds (μs), and it may be reasonable to assume that all pre and post echoes are within 150 μs of a main path.

In larger SFN environments, post echoes delays may exceed Tu/(2n), or Tu/6 in the example of FIG. 2. If post-echoes are constrained to be within Tu/6 of the main path, such long-delay post-echoes may appear as pre-echoes of a subsequent window. For larger SFN environments, the window may be adjusted iteratively to identify an optimum or suitable placement, which may be based on signal-to-noise ratios (SNRs). Trial and error placement of the window at periodic intervals may, however, lead to loss of picture.

Where a multi-carrier signal includes non-periodic symbols having encoded parameters, distributed over multiple carrier frequencies in a known pseudo-random fashion and modulated with a known modulation scheme, the encoded parameters may be used to reduce or eliminate channel impulse response cyclic ambiguity.

Such encoded parameters may be used estimate channel frequency responses of the corresponding carrier frequencies, which may be combined with scattered pilot based estimated channel frequency responses. The parameter based channel frequency responses may provide sufficient additional information to the IFFT to generate a channel impulse response with no cyclic ambiguity. Since the carrier frequencies of the encoded parameters are not necessarily distributed uniformly, the corresponding estimated channel frequency responses may contribute predominantly to the replica that corresponds to the channel impulse response, which may be used to identify the replica.

When cyclic ambiguity is reduced or removed from the channel impulse response, the channel impulse response identifies multi-paths with respect to a corresponding FFT trigger point. The multi-paths may be used to determine a more optimum FFT trigger point, which may be defined with respect to ISI and/or signal-to-noise ratio (SNR).

An initial FFT trigger point may be determined with an auto-correlation operation, which may be sufficient to identify scattered pilot locations and to obtain estimate channel frequency responses with respect to scattered pilot carrier signals.

Parameters are described below with respect terrestrial DVB signals, such as defined in ETSI EN 302 755 V1.1.1. Such parameters are not, however, limited to DVB signals or ETSI EN 302 755 V1.1.1.

Figure 4:
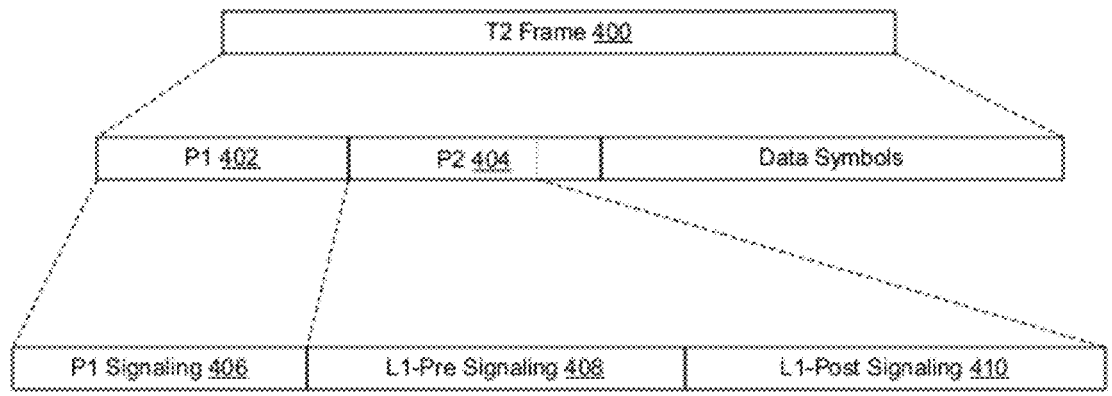
FIG. 4 is a depiction of a frame, which may correspond to a T2 frame of a DVB-T2 signal.

FIG. 4 is a depiction of a frame 400, which may correspond to a T2 frame of a DVB-T2 signal. A T2 is a fixed physical layer frame that may include variable size sub-slices.

Frame 400 may include data symbols and signaling information associated with the data symbols. In a DVB-T2 environment, such signaling may correspond to level one or L1 signaling.

Frame 400 may start with a P1 symbol 402, or one or more P2 symbols 404. P1 symbol 402 may include signaling information 406 regarding transmission type and basic transmission parameters. P2 symbol 404 may include signaling information to permit a receiver to access physical layer pipes within frame 400. P2 symbol 404 may also include data.

P2 symbol 404 may include L1-pre signaling information 408 and L1-post signaling information 410.

L1-pre signaling information 408 provides information to enable reception and decoding of L1-post signaling information 410. L1-pre signaling information may include static information fields such as scattered pilot patterns and frame size.

L1-post signaling information 410 may include parameters to permit a receiver to access physical layer pipes.

Under DVB-T2, ETSI EN 302 755 V1.1.1., §7.2, "all L1 signalling data, except for the dynamic L1-post signalling, shall remain unchanged for the entire duration of one superframe. Hence any changes implemented to the current configuration (i.e. the contents of the L1-pre signalling or the configurable part of the L1-post signalling) shall be always done within the border of two super-frames."

When a P2 symbol is transmitted, corresponding pre-L1 signaling may be distributed over multiple carrier frequencies in accordance with a known pseudo-random pattern, which may be modulated in accordance with a known modulation scheme, such as binary phase shift keying (BPSK) modulation. The L1-pre signaling carrier signals may be encoded with forward error correction using, for example, a low density parity code (LDPC), such as a ¼ rate LDPC. Such relatively robust modulation and encoding may help to ensure that the L1-pre signaling is received reliably under adverse conditions, such as 0 dB SNR and ISI, and that the L1-pre signaling bits may be decoded without optimum symbol timing recovery. Extracting of L1 pre-signaling is a generally a pre-requisite to acquiring a DVB-T2 signal.

Figure 5:
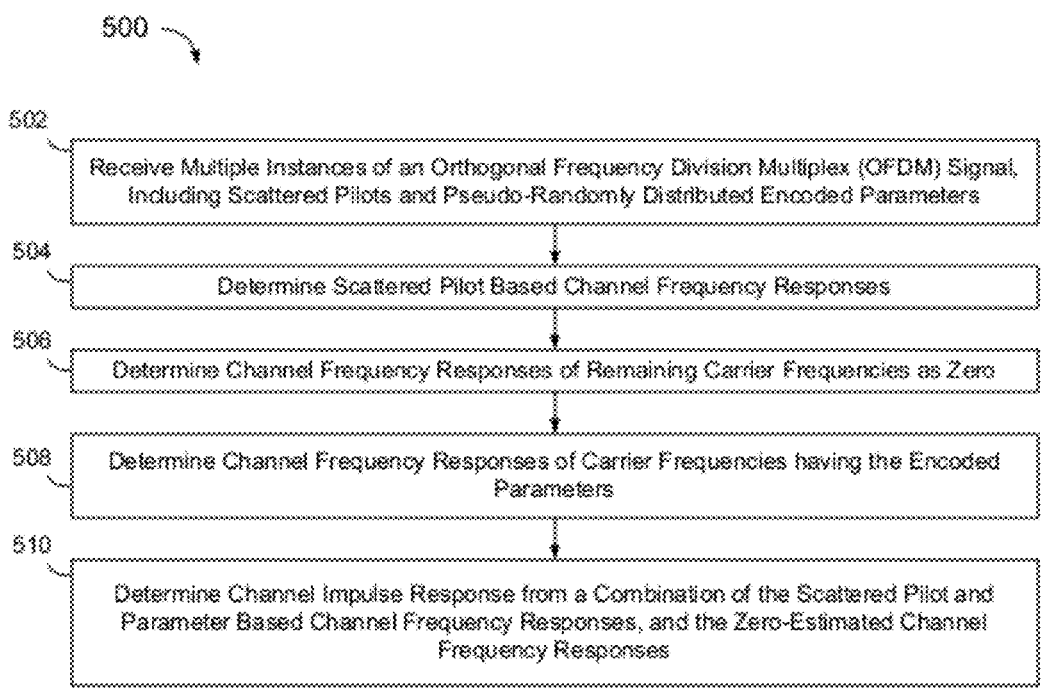
FIG. 5 is a process flowchart of a method of determining a channel impulse response from a combination of scattered pilots and encoded parameters distributed pseudo-randomly on carrier frequencies of an OFDM signal.

FIG. 5 is a process flowchart of a method 500 of determining a channel impulse response based on a combination of encoded parameters distributed pseudo-randomly over carrier frequencies, and scattered pilots.

At 502, multiple instances of an OFDM signal are received, including scattered pilots and pseudo-randomly distributed encoded parameters, such as described in one or more examples above.

The encoded parameters may include L1-pre signaling of a P2 symbol, such as described above. The encoded parameters are not, however, limited to L1-pre signaling or P2 symbols.

At 504, scattered pilot based channel frequency responses are estimated. The scattered pilot based channel frequency responses may be determined in accordance with one or more of a variety of techniques, including, without limitation, time predicting and/or time filtering.

At 506, channel frequency responses of remaining carrier frequencies, or a portion thereof, may be assigned a value of zero, such as described below with respect to FIG. 6.

Figure 6:
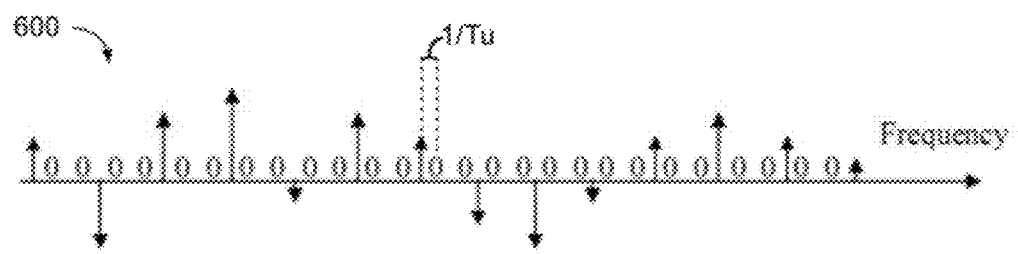
FIG. 6 is a depiction of scattered pilot based channel frequency responses and zero-estimated channel frequency responses.

FIG. 6 is a depiction of a channel frequency response 600, including scattered pilot based channel frequency responses, indicated with arrows, and assigned values of zero associated with remaining frequencies. In the example of FIG. 6, scattered pilot based channel frequency responses occur every 3$^{rd}$ carrier frequency.

Zero-padding of non-pilot carrier frequencies provides sample spacing in the frequency domain of 1/Tu, and replicas of a corresponding channel impulse response over Tu in the time domain, such as described below with respect to FIG. 7.

Figure 7:
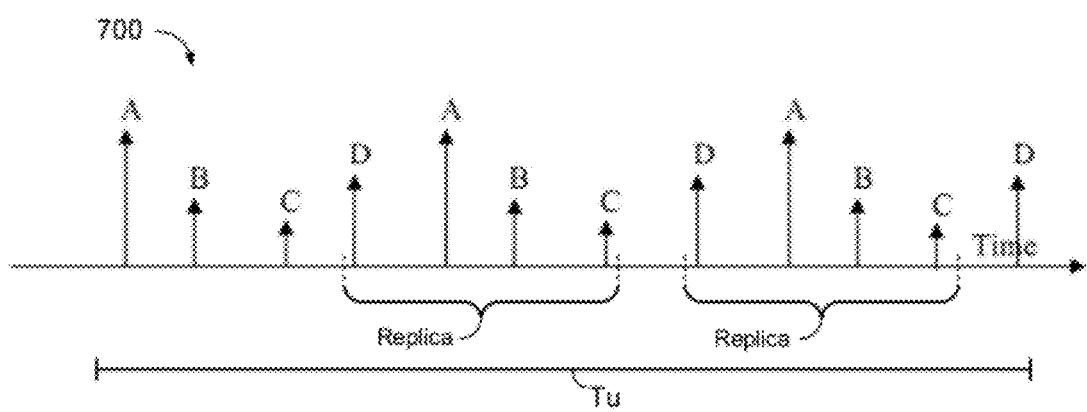
FIG. 7 is depiction of a sequence of time-domain points corresponding to output bins of an IFFT performed on the channel frequency responses of FIG. 6.

FIG. 7 is depiction of a sequence of time-domain points 700, corresponding to output bins of an IFFT performed on channel frequency responses 600 in FIG. 6. Since spacing in the frequency domain of FIG. 6 is 1/Tu, the IFFT provides a sequence in FIG. 7 having a length of Tu in the time domain.

In FIG. 7, the IFFT may be, for example, a 768-point IFFT. In FIG. 2, the IFFT may be, for example, a 256-point IFFT. The 768-point IFFT of the zero-inserted sequence of FIG. 6 is given by equation 1. This is seen to be equivalent to the 256-point IFFT sequence of FIG. 1. Therefore, FIG. 7 is a periodic repetition of FIG. 2 similar to FIG. 3.

$$x(i) = \sum_{k=0}^{255} X(3k)\exp\left(\frac{j2\pi(3k)i}{768}\right) \quad 0 \le i < 768 \quad \text{(Eq. 1)}$$

In FIG. 1, channel frequency responses are available once every three OFDM carriers in the frequency dimension. The channel frequency estimate is not known for two carriers between adjacent pairs of channel frequency responses of pilot carrier signals. In FIG. 6, unknown frequency estimates are assigned values of zero. The result is a channel impulse response periodic in Tu, as in FIG. 7, rather than Tu/3 as in FIG. 2. Nevertheless, zero-insertion does not yield a channel impulse with true periodicity Tu, since as explained above, the IFFT of duration Tu in FIG. 7, is a periodic repetition of FIG. 2 of duration Tu/3.

Returning to FIG. 5, at 508, channel frequency responses are determined with respect to the parameter encoded carrier frequencies. Example methods of determining channel frequency responses of the parameter encoded carrier frequencies are disclosed below with respect to FIGS. 11 and 12. The parameter based channel frequency responses may be inserted in place of zero-estimated channel frequency responses of corresponding carrier frequencies.

Figure 8:
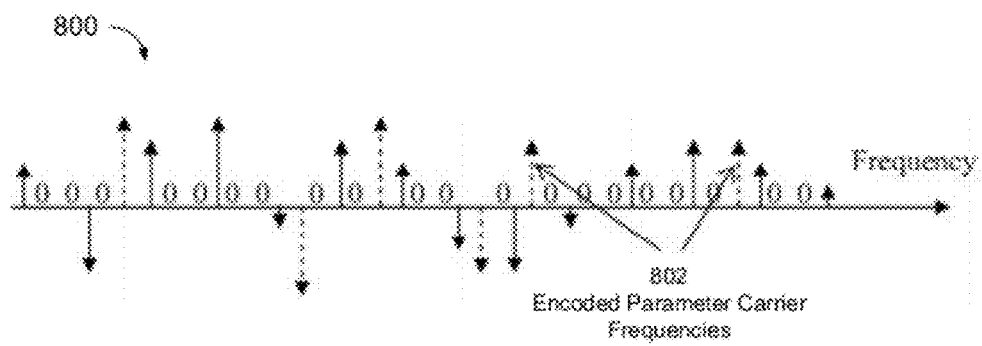
FIG. 8 is another depiction of channel frequency responses, wherein a portion of the zero-estimated channel frequency responses of FIG. 6 are replaced with parameter based channel frequency responses.

FIG. 8 is a depiction of a channel frequency response 800, wherein a portion of the zero-estimated channel frequency responses of FIG. 6 are replaced with parameter based channel frequency responses, which are illustrated with dashed arrows 802.

In the example above, zero-estimated channel frequency responses are assigned to non-scattered pilot carrier frequencies, and a subset of the zero-estimated values are subsequently replaced with parameter based estimates. This may be useful, for example, where the channel impulse response is selectively performed with respect to parameters when available, and without parameters when unavailable, such as described below with respect to FIG. 12. Alternatively, scattered pilot and parameter based channel frequency responses may be determined with respect to available carrier frequencies, and remaining carrier frequencies may subsequently be zero-padded.

At 510, a channel impulse response is determined from a combination of the scattered pilot based channel frequency responses, the parameter based channel frequency responses, and the zero-estimated channel frequency responses.

Figure 9:
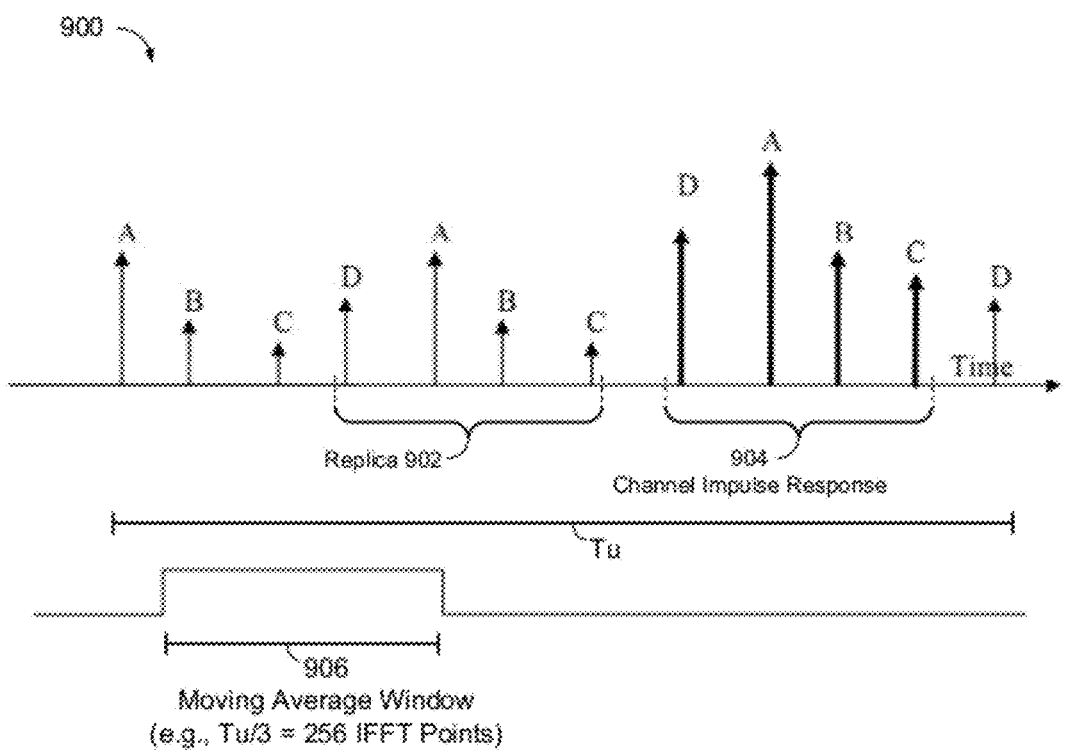
FIG. 9 is a depiction of a channel impulse response, which may correspond to an IFFT of the channel frequency responses of FIG. 8.

FIG. 9 is a depiction of a channel impulse response 900, which may correspond to an IFFT of channel frequency responses 800 in FIG. 8.

The IFFT of channel frequency responses 800 of FIG. 8 may be represented as:

$$x(i) = \sum_{k=0}^{255} X(3k)\exp\left(\frac{j2\pi(3k)i}{768}\right) + \sum_{k \in S} X(k)\exp\left(\frac{j2\pi k i}{768}\right) \quad \text{(Eq. 2)}$$

In equation 2, S may represent an OFDM carrier set corresponding to L1-pre signaling carriers of a P2 symbol.

Equation 2 includes first and second summation terms, reading from left to right. The first summation term corresponds to equation 1, and represents contribution of scattered pilot based channel frequency responses. The first summation term generates a channel impulse response that is periodic at Tu/n, as illustrated in by replicas in FIGS. 3 and 7, and by replicas 902 and 904 in FIG. 9.

The second summation term of equation 2 represents contribution of parameter based channel frequency responses, which is pseudo-randomly distributed amongst carrier frequencies and contributes constructively to only to replica that corresponds to the channel impulse response. As a result, one of replicas is distinguishable from other replicas, such as by amplitude and/or power associated with the corresponding IFFT bins. In FIG. 9, replica 904 is illustrated with bold lines to indicate that it corresponds to the true channel impulse response of FIG. 2. Channel impulse response 904 corresponds to multi-paths associated with the current or corresponding FFT trigger point.

Returning to FIG. 5, the determining of the channel impulse response at 510 may include identifying a strongest one of multiple replicas of the channel impulse response, with respect to one or more of amplitude and power.

Identifying a strongest one of the replicas may include computing a strength value of points within a moving window of time, and identifying a set of points, or a replica from the strength values as corresponding to the channel impulse response.

Identifying a strongest one of the replicas may include computing values within a moving window, and may include computing average values with a moving average window. As the window moves along the points, a peak in the moving average may correspond to the channel impulse response.

The window may correspond to a time period of Tu/n. Where the points correspond to a 768-point IFFT, and n equals 3, for example, the window may correspond to correspond to a time of Tu/3, or 256 points.

Figure 10:
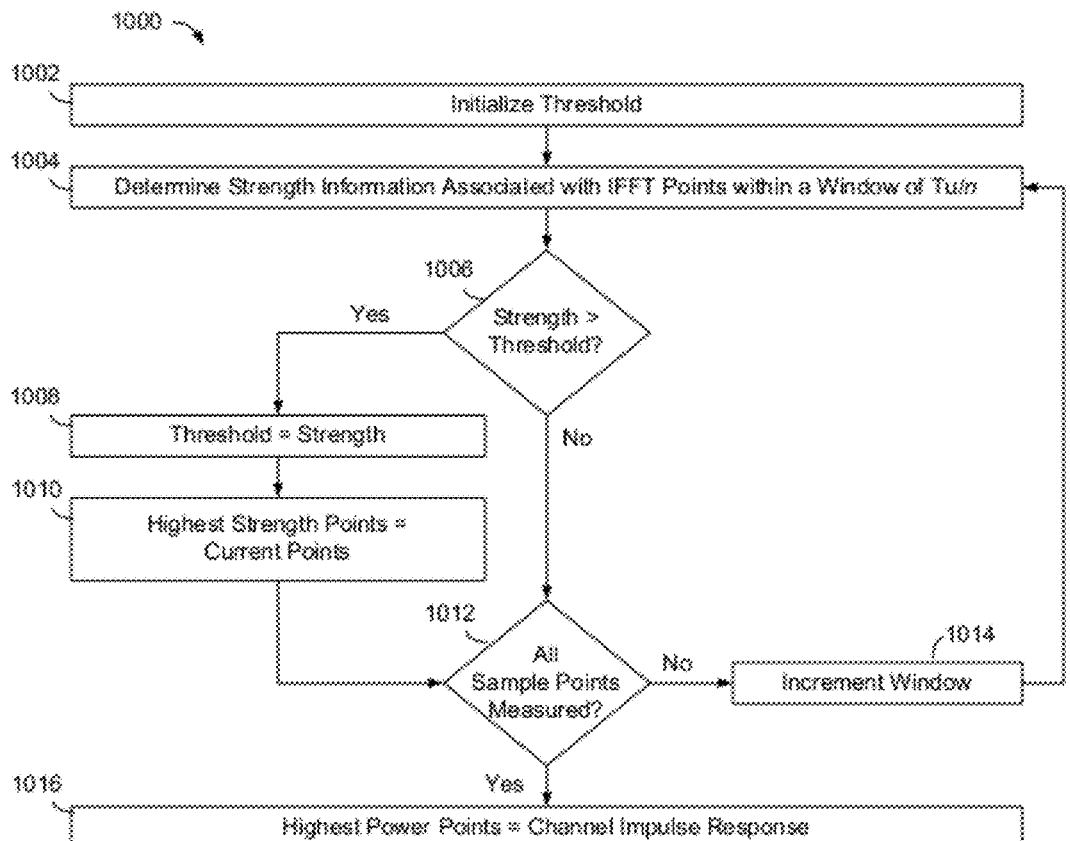
FIG. 10 is a process flowchart of a method of identifying a channel impulse response from periodic replicas of the channel impulse response.

FIG. 10 is a process flowchart of an example method 1000 of identifying a strongest replica from points of an IFFT.

At 1002, a threshold is initialized to zero.

At 1004, strength information is determined with respect to points within a window of time. The window of time may correspond to a time frame of Tu/n. FIG. 9 includes an example moving window 906.

The determining of the strength information at 1004 may include determining one or more of amplitude values and power values, such as square-amplitude values.

The determining of the strength information at 1004 may include point-wise multiplying of the amplitude or power values within the window of time, and summing the results.

At 1006, the strength value determined at 1004 is compared to the threshold. When the strength value does not exceed the threshold, processing proceeds to 1012, described below. When the strength value exceeds the threshold, processing proceeds to 1008.

At 1008, the threshold is set equal to the strength value determined at 1004.

At 1010, the points within the widow are identified as the highest strength points.

At 1012, a determination is made. When there is another point, the window is incremented or advanced at 1014, and processing returns to 1004 to determine strength information with respect to points within the re-positioned window.

At 1004, where strength information results are summed, such as described above, a new or independent summation may be performed with respect to all points within each window position.

Alternatively, a running summation may be maintained such that, when the window is moved to a new position, values associated with points that are no longer within the window are subtracted from the running summation, and values associated with new points within the window are added to the running summation.

At 1016, when all points have been evaluated, the set of points identified at 1010 as the highest strength points, are identified as the channel impulse response.

The IFFT bins associated with the channel impulse response may be stored, such as in a register, to identify a channel impulse response generated without encoded parameters, such as described below with respect to 1230 in FIG. 12.

Figure 11:
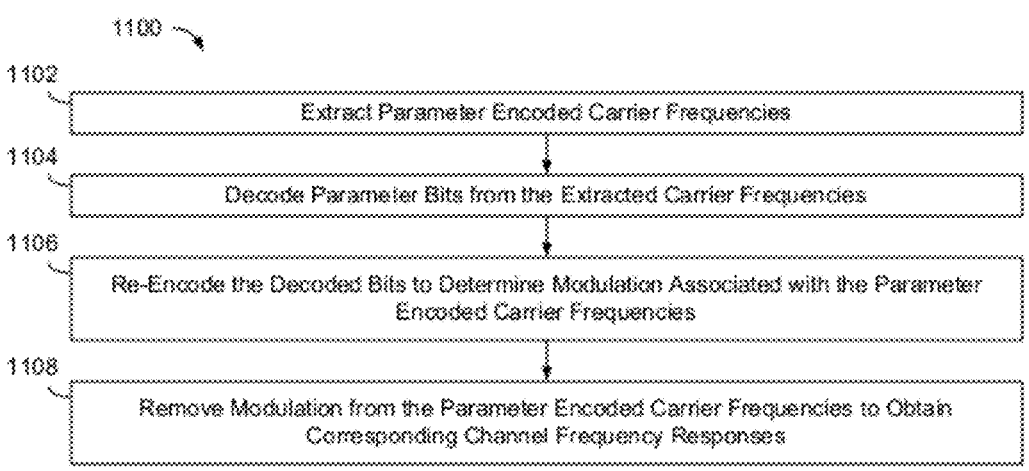
FIG. 11 is a process flowchart of a method of determining channel frequency responses of parameter encoded carrier frequencies.

FIG. 11 is a process flowchart of a method 1100 of determining channel frequency responses of parameter encoded carrier signals. Method 1100 may correspond to 508 in FIG. 5. Method 1100 may be implemented with respect to, for example, L1-pre signaling of a P2 symbol in a DVB-T2 environment.

At 1102, parameter encoded carrier signals are extracted from multiple instances of an OFDM signal. The parameter encoded carrier signals may be identified in accordance with a known pseudo-random pattern.

At 1104, parameter bits of the extracted carrier signals are decoded.

In a DVB-T2 environment, relatively robust modulation and LDPC channel coding permits L1 pre-signaling to be received even in the presence of ISI. L1 pre-signaling is typically extracted at an early stage, prior to completion of symbol timing recovery. L1-pre signaling bits may be thus decoded without optimum symbol timing recovery.

Decoding of the bits at 1104 may include determining log-likelihood-ratios (LLRs) and decoding in accordance with an LDPC, which may include rate ¼ LDPC decoding.

At 1106, the decoded bits are re-encoded. Where rate ¼ LDPC decoding is used at 1104, re-encoding at 1106 may include rate ¼ LDPC encoding. Rate ¼ LDPC encoding may involve fewer calculations and resources relative to rate ¼ LDPC decoding.

Re-encoding of the bits at 1106 provides the modulation of the corresponding parameter encoded carrier signals.

At 1108, the modulation is removed from the parameter encoded carrier signals in accordance with the corresponding modulation determined at 1106.

The modulation-removed parameter encoded carrier signals represent the channel frequency responses of the corresponding parameter encoded carrier signals, and may be utilized at 510 in FIG. 5, to determine the channel impulse response.

Method 500 in FIG. 5 may be repeated upon receipt of another symbol having encoded parameters. Between receptions of such symbols, portions of method 500 may be repeated without parameter based channel frequency responses, such as described below with respect to FIG. 12.

Figure 12:
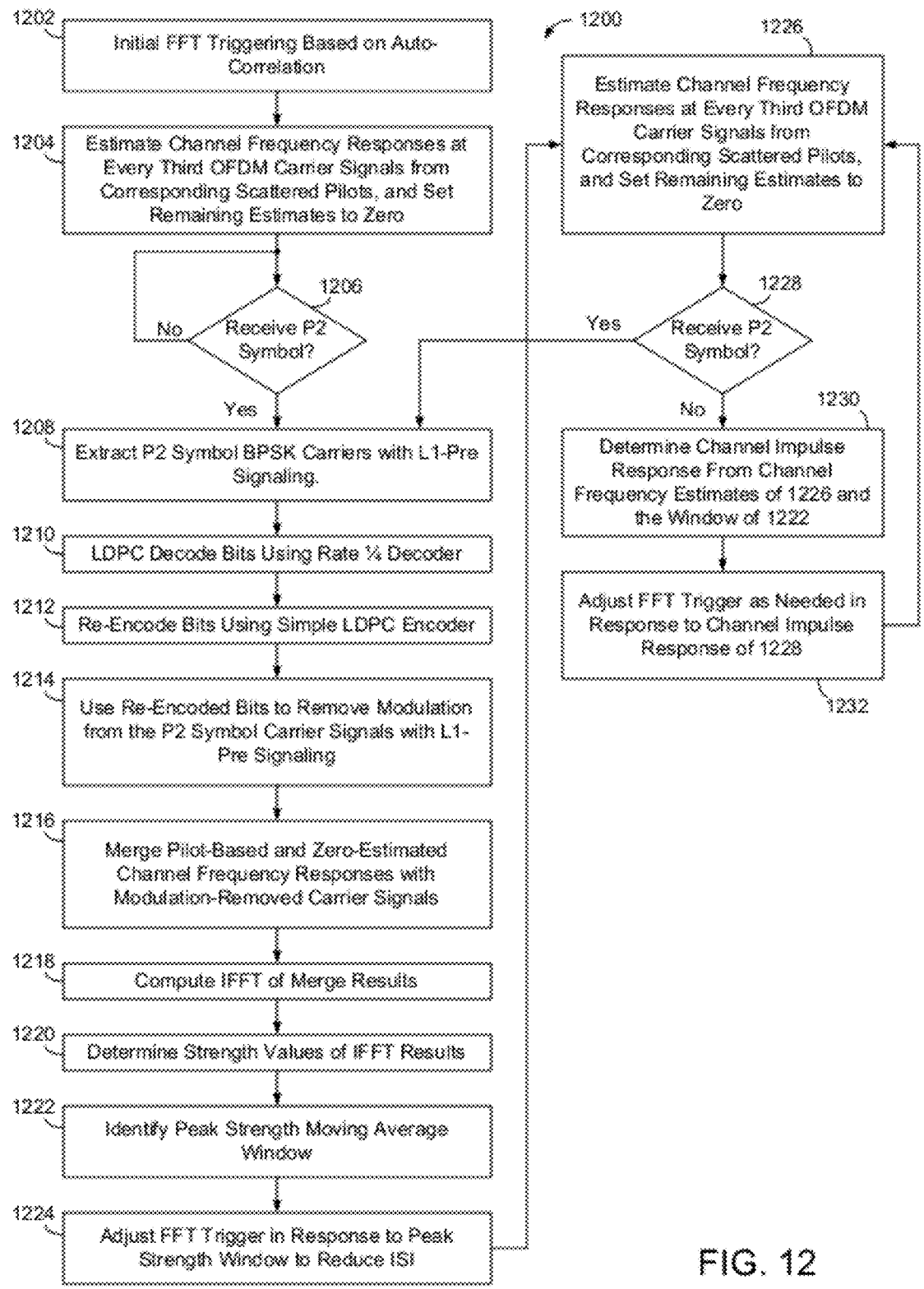
FIG. 12 is a process flowchart of a method of determining a channel impulse response with respect to parameters when available, and without respect to parameters when unavailable, including re-using a previously identified window of IFFT bins to remove cyclic ambiguity when the parameters are unavailable.

FIG. 12 is a process flowchart of a method 1200 of selectively determining a channel impulse response with respect to parameters when available, and without parameters when unavailable, including re-using a previously identified window of time, or IFFT bins to remove cyclic ambiguity when parameters are unavailable.

Method 1200 is described below with respect to a DVB-T2 OFDM signal. Method 1200 is not, however, limited to DVB-T2 OFDM signals.

At 1202, an initial FFT trigger point is utilized to perform a FFT process on samples of multiple instances of an OFDM signal. The initial FFT trigger point may be determined in accordance with an auto-correlation procedure.

At 1204, scattered pilot based channel frequency responses are determined and channel frequency responses of remaining carrier signals are set to zero.

At 1206, processing waits for receipt of a P2 symbol.

At 1208, upon receipt of a P2 symbol, BPSK carriers of the P2 symbol that have L1-pre signaling are extracted.

At 1210, bits of the L1-pre signaling are decoded. The decoding may include rate ¼ LDPC decoding.

At 1212, the bits of the L1-pre signaling are re-encoded. Where rate ¼ LDPC decoding is used at 1210, re-encoding at 1212 may include rate ¼ LDPC encoding.

At 1214, the re-encoded bits are used to remove modulation from the P2 symbol carrier signals having the L1-pre signaling.

At 1216, scattered pilot based and zero-estimated channel frequency responses, generated above with respect to 1204 or below with respect to 1226, are merged with the modulation-removed carrier signals produced at 1214.

At 1218, an IFFT is computed with respect to the merge results generated at 1216.

At 1220, strength values of results of the IFFT are determined. The strength values may correspond to one or more of amplitudes and power levels.

At 1222, a moving average window is used to identify a peak-strength window, such as described above with respect to FIG. 10.

At 1224, the FFT trigger point may be adjusted in response to the peak-strength window, such as to reduce ISI.

Channel impulse responses may subsequently be determined from scattered pilot based and zero-estimated channel frequency responses, even in the absence of parameter encoded symbols. For example, in a DVB-T2 environment, P1 and P2 symbols may occur approximately at 100 symbol intervals. Between P2 symbols, the IFFT may be applied to scattered pilot based and zero-estimated channel frequency responses, and the peak strength window identified at 1222 may be used to remove cyclic ambiguity. In other words, the peak strength window identified at 1222 may be used to maintain a lock around the correct sequence or replica.

At 1226 in FIG. 12, scattered pilot based channel frequency responses are determined and channel frequency responses of remaining carrier frequencies are set to zero.

At 1228, a determination is made. When a P2 symbol is detected, processing returns to 1208. When a P2 is not detected, processing proceeds to 1230.

At 1230, an IFFT is performed on the scattered pilot based and zero-estimated channel frequency responses generated at 1226, and the window identified at 1222 is used to identify the points that correspond to channel impulse response. Although the channel impulse response may change in response to the adjusting of the FFT trigger at 1224, the adjustment to the FFT trigger at 1224 will generally be within a relatively limited range that may not significantly alter the set of IFFT bins associated with the peak strength window identified at 1222.

At 1232, the FFT triggering point may be re-adjusted in response to the channel impulse response identified at 1230.

Where multiple P2 symbols are available at one or more of 1206 and 1228, processing at 1208 through 1214 may be performed with respect to each of the multiple P2 symbols, and the corresponding modulation-removed carrier signals may be merged at 1216 with the scattered pilot based and zero-estimated channel frequency responses generated at 1204 or 1226.

Figure 13:
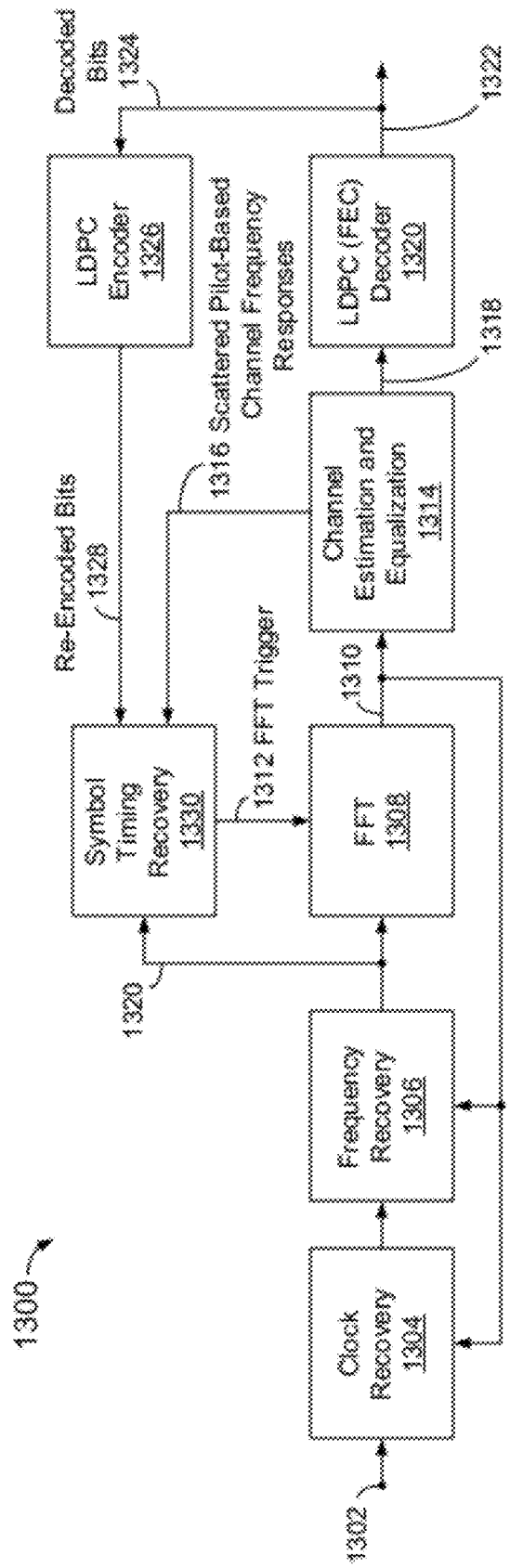
FIG. 13 is a block diagram of a portion of a receiver system to determine a channel impulse response with respect to parameters when available, and without respect to parameters when unavailable, including to re-use a previously identified window of IFFT bins to remove cyclic ambiguity when the parameters are unavailable.

FIG. 13 is a block diagram of a portion of a receiver system 1300 to receive a digitized signal 1302, corresponding to a plurality of instances of an OFDM signal, such as described in one or more examples above.

System 1300 includes a clock recovery system 1304 to recover clock information and a frequency recovery system 1306 to recover frequency information from digitized signal 1302.

System 1300 further includes a FFT module 1308 to generate frequency domain samples 1310 of digitized signal 1302, in response to a FFT trigger 1312.

System 1300 further includes a channel estimation and equalization system 1314 to estimate scattered pilot based channel frequency responses 1316, and to equalize and output samples 1310 as equalized samples 1318.

System 1300 further includes a decoder 1320 to decode bits 1322 from equalized samples 1318, including parameter bits 1324. Parameter bits 1324 may include P2 symbol L1-pre signaling bits. Decoder 1320 may include a rate ¼ LDPC decoder.

System 1300 further includes an encoder 1326 to re-encode bits 1324 as re-encoded bits 1328. Encoder 1326 may include a rate ¼ LDPC encoder.

System 1300 further includes a sample timing recovery system 1330 to control FFT trigger point 1312 in response to timing and frequency information 1320, scattered pilot based channel frequency responses 1316, and re-encoded bits 1328, such as described in one or more examples herein.

Figure 14:
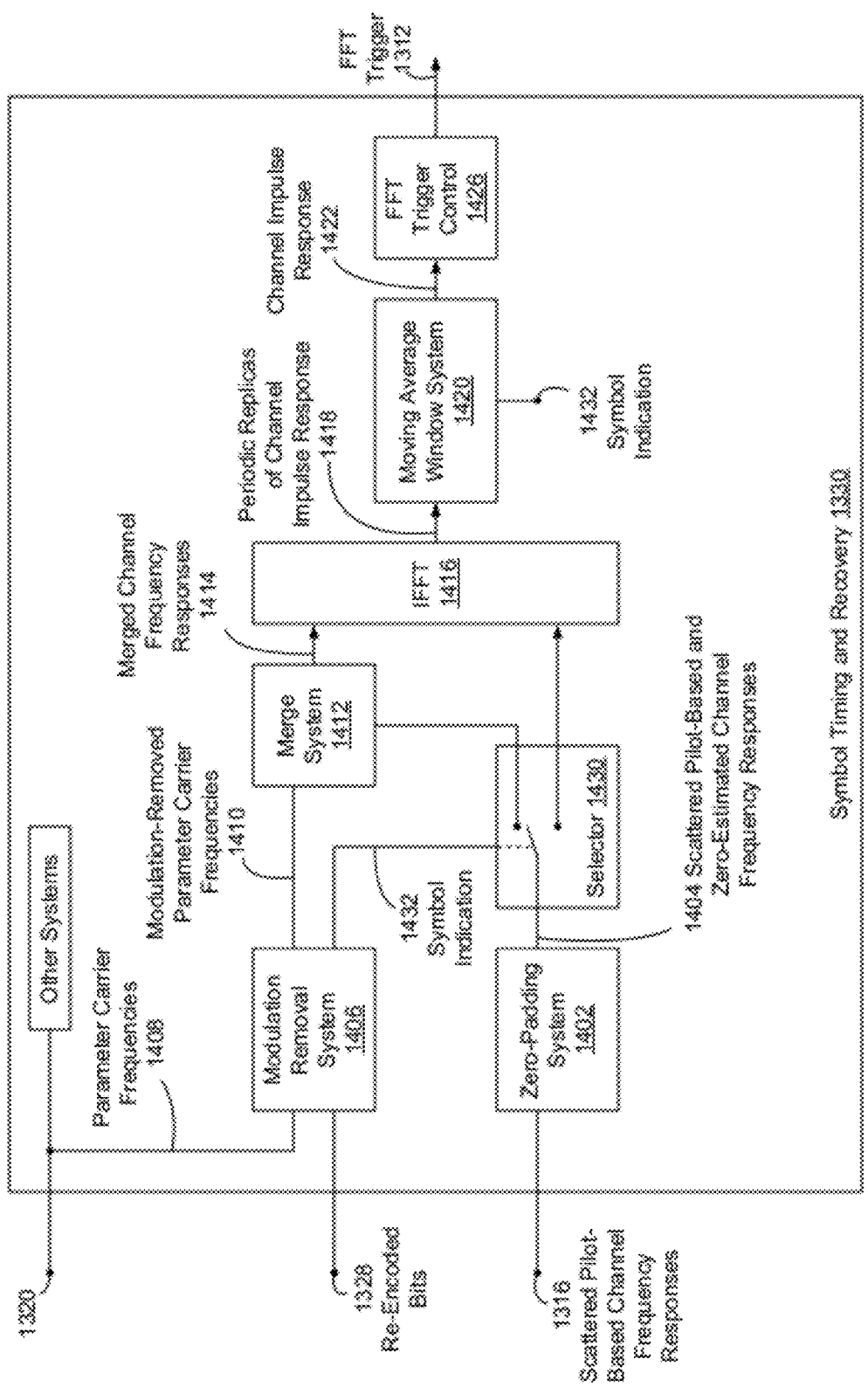
FIG. 14 is a block diagram of a symbol timing recovery system of FIG. 13.

FIG. 14 is an example block diagram of symbol timing recovery system 1330, including a zero-padding system 1402 to receive scattered pilot based channel frequency responses 1316, to zero-pad channel frequency responses of non-pilot carrier frequencies, and to output corresponding scattered pilot based and zero-estimated channel frequency responses 1404, such as described above with respect to FIG. 6.

Symbol timing recovery system 1330 further includes a modulation removal system 1406 to remove modulation from parameter carrier frequencies 1408 based on re-encoded bits 1328, and to output corresponding modulation-removed parameter carrier frequencies 1410, such as described in one or more examples above.

Symbol timing recovery system 1330 further includes a merge system 1412 to merge modulation-removed parameter carrier frequencies 1410 and scattered pilot based and zero-estimated channel frequency responses 1404, and to output merged channel frequency responses 1414, such as described above with respect to FIG. 8.

Symbol timing recovery system 1330 further includes an IFFT 1416 to perform an IFFT with respect to merged channel frequency responses 1414. IFFT 1416 may generate points 1418 corresponding to periodic replicas of a channel impulse, such as described above with respect to FIG. 9.

Symbol timing recovery system 1330 further includes a moving average window system 1420 to identify one of replicas 1414 as a channel impulse response 1422 associated with FFT trigger 1312. Channel impulse response 1422 may identify multi-paths corresponding to FFT trigger 1312.

Symbol timing recovery system 1330 further includes a FFT trigger control system 1426 to adjust FFT trigger 1312 in response to channel impulse response 1422. FFT trigger control 1426 may be configured to adjust FFT trigger 1312 to reduce ISI in subsequent frequency domain samples 1310.

Symbol timing recovery system 1330 may be configured to determine channel impulse response 1422 in the absence of symbols having encoded parameters, such as described above with respect to FIG. 12.

For example, symbol timing recovery system 1330 may include a selector 1430 to selectively provide scattered pilot based and zero-estimated channel frequency responses 1404 to merge system 1412 or to IFFT 1416, such as described above with respect to 1228, in FIG. 12. Selector 1430 may be configured to respond to an indication 1432 of a detected symbol having encoded parameters, such as a P2 symbol. Indication 1432 may be provided by modulation removal system 1406 or by another module within or outside of symbol timing recovery system 1330.

When IFFT points or periodic replicas 1418 are generated without modulation-removed parameter carrier frequencies 1410, moving average window system 1420 may be configured to utilize a previously determined window, corresponding to a set of output bins of IFFT 1416, to identify one of replicas 1418 as the channel impulse response, such as described above with respect to 1230 in FIG. 12. In this way, symbol timing recovery system 1330 may track a channel impulse response based on scattered pilots and relatively occasional symbols having encoded parameters.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

For example, and without limitation, system 1300 in FIG. 13, or portions thereof, including symbol timing and recovery system 1330 in FIG. 14, or portions thereof, may be implemented within hardware-based digital logic circuitry, an instruction processor, including a micro-controller, and combinations thereof. Variables may be held in one or more of buffers, registers, and memory cells.

Figure 15:
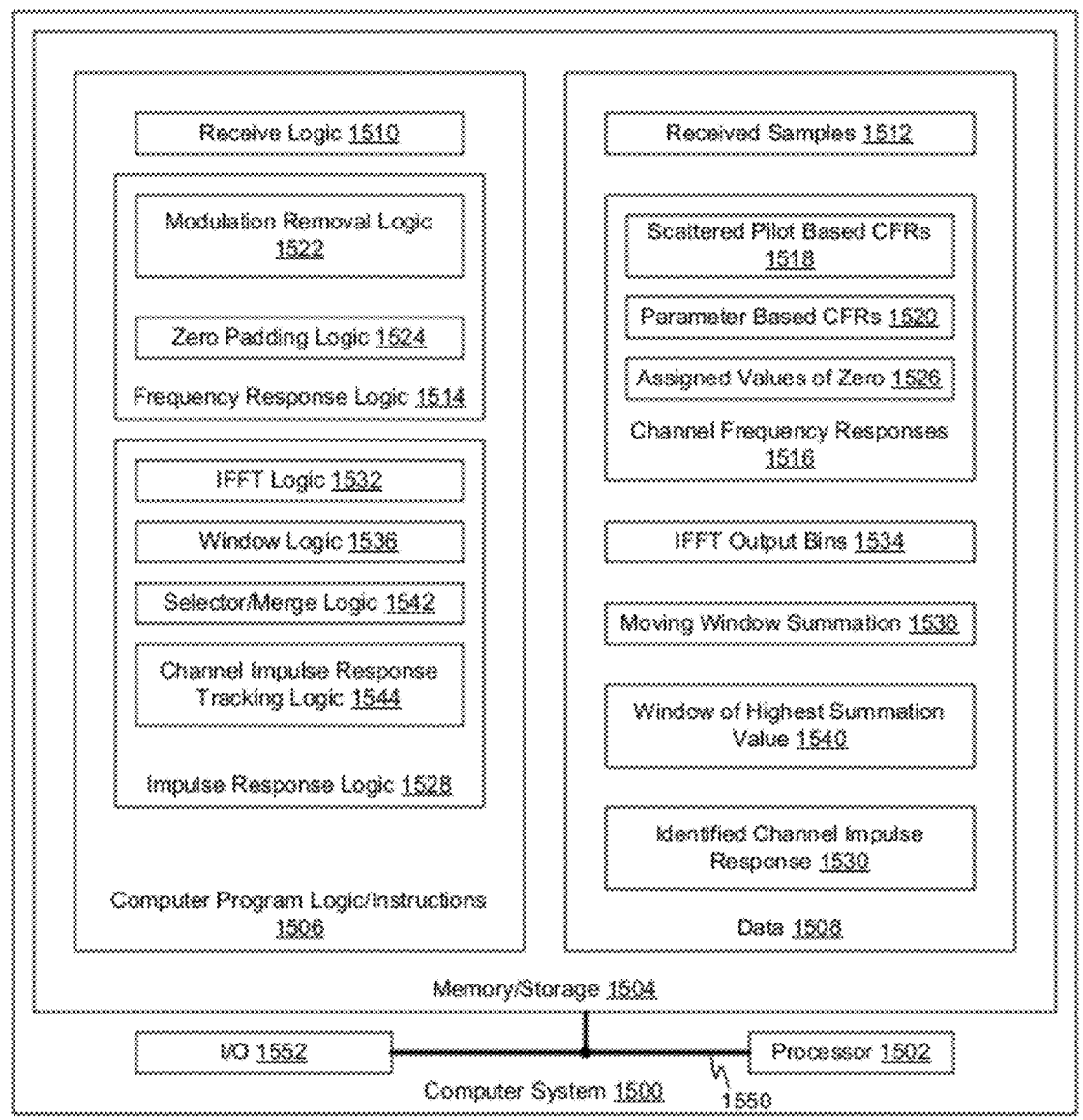
FIG. 15 is a block diagram of an instruction processor system, configured to determine a channel impulse corresponding to multiple instances of a received OFDM signal, from a combination of scattered pilots and encoded parameters distributed pseudo-randomly over carrier signals of the OFDM signal.

FIG. 15 is a block diagram of an instruction processor system 1500, configured to determine a channel impulse corresponding to multiple instances of a received OFDM signal, from a combination of scattered pilots and encoded parameters distributed pseudo-randomly over carrier signals of the OFDM signal.

System 1500 includes one or more computer instruction processing units, illustrated here as a processor 1502, to execute computer program product logic, also known as instructions, code, and software.

System 1500 further includes memory and/or storage 1504, including a computer readable medium having computer program product logic or instructions 1506 stored thereon, to cause processor 1502 to perform one or more functions in response thereto.

Memory/storage 1504 further includes data 1508 to be used by processor 1502 in executing instructions 1506, and/or generated by processor 1502 in response to execution of instructions 1506.

In the example of FIG. 15, logic 1506 includes receive logic 1510 to cause processor 1502 to receive samples 1512 of a digitized signal, corresponding to multiple instances of an orthogonal frequency division multiplex (OFDM) signal having scattered pilots and having encoded parameters dispersed pseudo-randomly amongst carrier frequencies.

Logic 1506 further includes frequency response logic 1514 to cause processor 1502 to determine channel frequency responses 1516 from the scattered pilots and from the encoded parameters, illustrated here as scattered pilot based frequency responses 1518 and parameter based channel frequency responses 1520.

Frequency response logic 1514 may include modulation removal logic 1522 to cause processor 1502 remove modulation from carrier frequencies having the encoded parameters, such as described in one or more examples above.

Frequency response logic 1514 may include zero-padding logic 1524 to cause processor 1502 to assign values of zero 1526 to other carrier frequencies, such as described in one or more examples above.

Logic 1506 further includes impulse response logic 1528 to cause processor 1502 to determine a channel impulse response 1530 from a combination of channel frequency responses 1516, such as described in one or more examples above.

Impulse response logic 1528 may include Inverse Fast Fourier Transform (IFFT) logic 1532 to cause processor 1502 to convert the combination of channel frequency responses 1516 to time-domain impulse responses 1534 representative of periodic replicas of the channel impulse response, such as described in one or more examples above.

Impulse response logic 1528 may include window logic 1536 to cause processor 1502 to sum amplitudes of the impulse responses within a moving window of time, illustrated here as moving window summation 1538, to identify the impulse responses within a window of time having a greatest summation value as channel impulse response 1530, and to store an indication of the window of time 1540.

Impulse response logic 1528 may include selector/merge logic 1542 to cause processor 1502 to merge encoded parameter based channel frequency responses 1520 with scattered pilot based channel frequency responses 1518 and zero value assigned channel frequency responses 1526, and to invoke IFFT logic 1532 with respect to the merged channel frequency responses when parameter based channel frequency responses 1520 are available.

Selector logic 1542 may include logic to cause processor 1502 to invoke IFFT logic 1532 with respect to scattered pilot based channel frequency responses 1518 and zero value assigned channel frequency responses 1526 when parameters based channel frequency responses 1520 are unavailable.

Impulse response logic 1528 may include channel impulse response tracking logic 1544 to cause processor 1502 to track the channel impulse response between receipts of encoded parameters, based on scattered parameter based channel frequency responses 1518, zero value assigned channel frequency responses 1526, and a prior window of highest summation value 1540, such as described in one or more examples above.

One or more portions of logic 1506 described above may alternatively be implemented in hardware.

System 1500 may include a communications infrastructure 1550 to provide communication within system 1500.

System 1500 may include an input/output controller 1552 to provide communication with external systems.

System 1500 may be configured to host one or more operating environments within which to execute logic 1506.

Processor 1502 may include a micro-controller. Logic 1506, or portions thereof, may be stored in firmware and copied to local memory at run-time.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein.

Thus, the breadth and scope of the claims should not be limited by any of the example embodiments disclosed herein.

What is claimed is:

1. A method, comprising:
receiving multiple instances of an orthogonal frequency division multiplex (OFDM) signal, including scattered pilots and encoded parameters;
estimating channel frequency responses from the scattered pilots;
determining channel frequency responses of carrier frequencies having the encoded parameters from the corresponding encoded parameters; and
determining a channel impulse response from a combination of the scattered pilot based channel frequency responses and the parameter based channel frequency responses.

2. The method of claim 1, wherein the determining of the channel impulse response includes:
converting the scattered pilot based channel frequency responses and the parameter based channel frequency responses to a time-domain representation of periodic replicas of the channel impulse response; and
identifying one of the replicas as the channel impulse response based on strengths of the time-domain replicas, including identifying a window of time corresponding to the identified replica.

3. The method of claim 2, further including, subsequent to the identifying of the window of time:
tracking the channel impulse response prior to receipt of additional encoded parameters based on scattered pilot based channel frequency responses, zero value assigned channel frequency responses of remaining carrier frequencies, and the identified window of time.

4. The method of claim 1, wherein the scattered pilots occur at intervals of m carrier frequencies, where m is a positive integer, wherein a symbol period of the OFDM signal is approximately Tu, and wherein:
the estimating of the channel frequency responses from the scattered pilots includes estimating channel frequency responses of every $n^{th}$ carrier frequency, where n is a positive integer between one and m; and
the determining of the channel impulse response includes, converting the channel frequency responses to time-domain impulse responses over the period Tu, including a plurality of replicas of the channel impulse response periodic at Tu/n, and
identifying one of the replicas as the channel impulse response based on amplitudes of the corresponding impulse responses.

5. The method of claim 4, wherein the identifying of the replica includes:
summing magnitudes of impulse responses within a moving window of time Tu/n; and
identifying impulse responses within a window of time Tu/n having a greatest summation value as the channel impulse response.

6. The method of claim 4, wherein the receiving includes:
receiving an instance of the OFDM signal having a delay greater than Tu/2n relative to a main path instance of the OFDM signal.

7. The method of claim 1, wherein the receiving includes:
receiving an instance of the OFDM signal having a delay beyond a guard interval of the OFDM signal.

8. The method of claim 1, wherein the determining of the channel frequency responses of carrier frequencies having the encoded parameters includes:
identifying and extracting the carrier frequencies having the encoded parameters;
decoding parameter bits from the extracted carrier frequencies;
re-encoding the decoded bits; and
removing modulation from the parameter encoded carrier frequencies in accordance with the re-encoded bits to obtain corresponding channel frequency responses.

9. The method of claim 1, wherein the encoded parameters are distributed pseudo-randomly amongst the carrier frequencies within symbols that occur less frequently than symbols having the scattered pilots and not having the encoded parameters.

10. The method of claim 1, wherein time-domain samples of the channel impulse response correspond to multi-paths associated with a Fast Fourier Transfer (FFT) trigger point, the method further including:
adjusting the FFT trigger point in response to the identified channel impulse.

11. The method of claim 1, wherein the receiving includes receiving multiple instances of a digital video broadcast signal, and wherein the encoded parameters include L1 pre-signaling parameters.

12. A system, comprising:
a receiver to receive multiple instances of an orthogonal frequency division multiplex (OFDM) signal having scattered pilots and having encoded parameters dispersed pseudo-randomly amongst carrier frequencies, wherein the receiver is configured to determine estimated channel frequency responses from the scattered pilots and from the encoded parameters, and to determine a channel impulse response from a combination of the scattered pilot based channel frequency responses and the encoded parameter based channel frequency responses.

13. The system of claim 12, wherein the receiver includes:
an Inverse Fast Fourier Transform (IFFT) to convert the channel frequency responses to time-domain impulse responses representative of periodic replicas of the channel impulse response;
a moving average window system to sum amplitudes of the impulse responses within a moving window, to identify the impulse responses within a window of time having a greatest summation value as the channel impulse response, and to store an indication of the window of time;
a selector to merge the scattered pilot and the encoded parameter based channel frequency responses and to provide the merged channel frequency responses to the IFFT when the parameters are available, and to provide the scattered pilot based channel frequency responses to the IFFT prior to receipt of additional encoded parameters; and
a channel impulse response tracking system to track the channel impulse response prior to receipt of additional encoded parameters based on scattered parameter based channel frequency responses and the stored indication of the window of time.

14. The system of claim 12, wherein the receiver includes:
a zero-padding system to populate channel frequency responses of remaining carrier frequencies with values of zero.

15. The system of claim 12, wherein the receiver includes:
a modulation remover to decode parameter bits from the parameter encoded carrier signals, to re-encode the decoded bits, and to remove modulation from the parameter encoded carrier signals in accordance with the re-encoded bits to obtain corresponding channel frequency responses.

16. The system of claim 12, wherein the scattered pilots occur at intervals of m carrier frequencies, where m is a positive integer, wherein a symbol period of the OFDM signal is approximately Tu, and wherein the receiver is configured to:
estimate the scattered pilots based channel frequency responses of every $n^{th}$ carrier frequency, where n is a positive integer between one and m;
convert the combination of the channel frequency responses to time domain impulse responses over the period Tu, including a plurality of replicas of the channel impulse response periodic at Tu/n;
sum magnitudes of impulse responses within a moving window of time Tu/n; and
identify impulse responses within a window of time Tu/n having a greatest summation value as the channel impulse response.

17. A computer program product including a computer readable media having computer program logic thereon to cause a processor to perform functions in response thereto, the computer program logic including:
receive logic to cause the processor to receive samples of a digitized signal, corresponding to multiple instances of an orthogonal frequency division multiplex (OFDM) signal having scattered pilots and having encoded parameters dispersed pseudo-randomly amongst carrier frequencies;
frequency response logic to cause the processor to determine estimated channel frequency responses from the scattered pilots and from the encoded parameters and to assign values of zero to channel frequency responses of remaining carrier frequencies;
impulse response logic to cause the processor to determine a channel impulse response from a combination of the scattered pilot based channel frequency responses and the encoded parameter based channel frequency responses.

18. The computer program product of claim 17, wherein the impulse response logic includes:
Inverse Fast Fourier Transform (IFFT) logic to cause the processor to convert the channel frequency responses to time-domain impulse responses representative of periodic replicas of the channel impulse response;
window logic to cause the processor to sum amplitudes of the impulse responses within a moving window of time, to identify the impulse responses within a window of time having a greatest summation value as the channel impulse response, and to store an indication of the window of time;
selector logic to cause the processor to merge the scattered pilot and the encoded parameter based channel frequency responses and to invoke the IFFT logic with respect to the merged channel frequency responses when the parameters are available, and to invoke the IFFT logic with respect to scattered pilot based channel frequency responses prior to receipt of additional encoded parameters; and
channel impulse response tracking logic to cause the processor to track the channel impulse response prior to receipt of additional encoded parameters based on scattered parameter determined channel frequency responses, zero value assigned channel frequency responses, and the stored indication of the window of time.

19. The computer program product of claim 17, wherein the frequency response logic includes:
modulation remover logic to cause the processor to decode parameter bits from the parameter encoded carrier signals, to re-encode the decoded bits, and to remove modulation from the parameter encoded carrier signals in accordance with the re-encoded bits to obtain corresponding channel frequency responses.

20. The computer program product of claim 17, wherein the scattered pilots occur at intervals of m carrier frequencies, where m is a positive integer, wherein a symbol period of the OFDM signal is approximately Tu, and wherein:
the frequency response logic includes logic to cause the processor to estimate the scattered pilots based channel frequency responses of every $n^{th}$ carrier frequency, where n is a positive integer between one and m;
the channel impulse logic includes,
logic to cause the processor to convert the combination of the channel frequency responses to time domain impulse responses over the period Tu, including a plurality of replicas of the channel impulse response periodic at Tu/n,
logic to cause the processor to sum magnitudes of impulse responses within a moving window of time Tu/n, and
logic to cause the processor to identify impulse responses within a window of time Tu/n having a greatest summation value as the channel impulse response.

* * * * *

UNITED STATES PATENT AND TRADEMARK OFFICE
CERTIFICATE OF CORRECTION

| | | |
|---|---|---|
| PATENT NO. | : 8,340,222 B2 | |
| APPLICATION NO. | : 12/647060 | |
| DATED | : December 25, 2012 | |
| INVENTOR(S) | : Bernard Arambepola et al. | |

It is certified that error appears in the above-identified patent and that said Letters Patent is hereby corrected as shown below:

On the Title page, in Item (75), in column 1, in "Inventors", line 3, delete "Praveen K. Shukla" and insert -- Parveen K. Shukla --, therefor.

Signed and Sealed this
Seventh Day of May, 2013

Teresa Stanek Rea
*Acting Director of the United States Patent and Trademark Office*